United States Patent [19]
Jones, Jr. et al.

[11] 3,904,797
[45] Sept. 9, 1975

[54] HOMEOTROPIC ALIGNMENT OF LIQUID CRYSTALS IN A DISPLAY CELL BY BAKED ON IONIC SURFACTANTS

[75] Inventors: Freeman B. Jones, Jr., Westlake Village; Ronald M. Govan, Camarillo, both of Calif.

[73] Assignee: Rockwell International Corporation, El Segundo, Calif.

[22] Filed: May 7, 1973

[21] Appl. No.: 357,567

[52] U.S. Cl. .......... 428/1; 23/230 LC; 252/408 LC; 350/160 LC
[51] Int. Cl.$^2$..... B44F 1/00; C09K 3/34; G02F 1/29
[58] Field of Search .......... 161/1; 252/299, 408 LC; 23/230 LC; 350/160 LC

[56] References Cited
UNITED STATES PATENTS
3,799,651  3/1974  Janning.......................... 350/160 LC Primary Examiner—Mayer Weinblatt
Assistant Examiner—Edith R. Buffalow
Attorney, Agent, or Firm—H. Fredrick Hamann; G. Donald Weber, Jr.; Robert Ochis

[57] ABSTRACT

An ionic surfactant in a solvent is coated on the interior walls of a cell for a liquid crystal display. After evaporation of the solvent, the cell is heated to bake on the deposited surfactant. Ionically doped nematic liquid crystals introduced into the cell immediately align themselves homeotropically (perpendicular to the wall). This increases the liquid crystal contrast ratio and eliminates the slight contrast normally present in doped liquid crystals even in the quiescent state.

6 Claims, 4 Drawing Figures

FILL AND SEAL

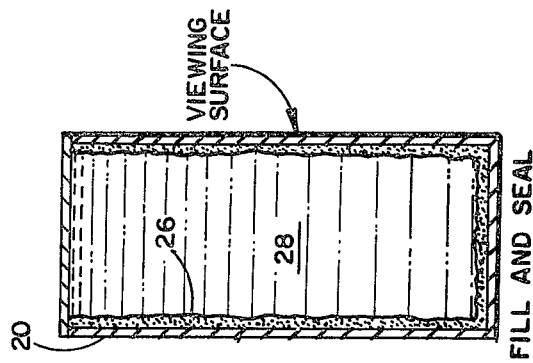
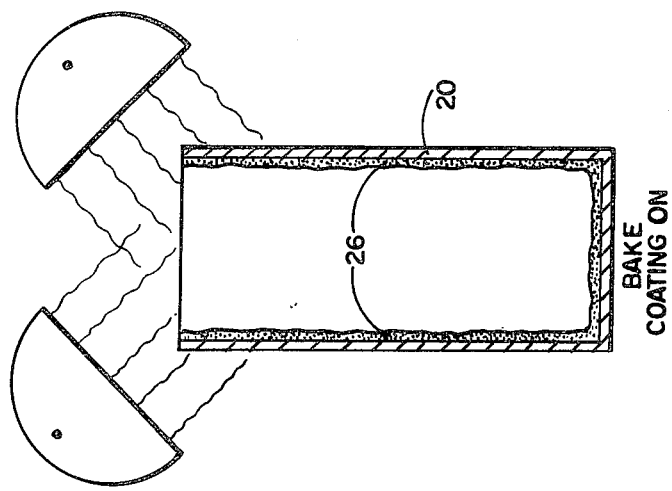
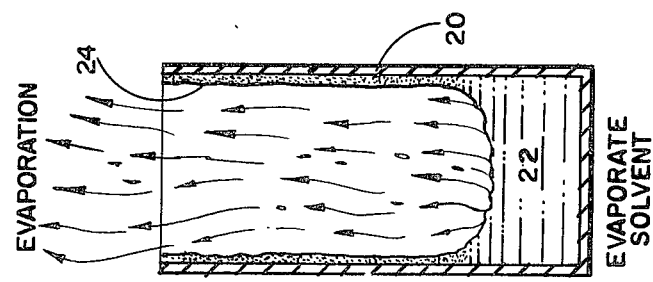
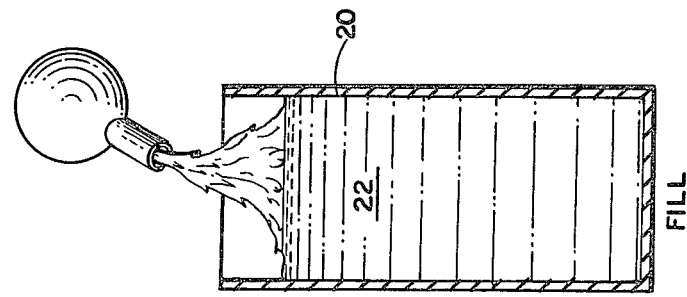

HOMEOTROPIC ALIGNMENT OF LIQUID CRYSTALS IN A DISPLAY CELL BY BAKED ON IONIC SURFACTANTS

RELATED APPLICATIONS

This application is related to two other applications, each of which was filed on May 7, 1973 and each of which is assigned to the assignee of this patent. The related applications are Ser. No. 357,566 entitled "Doping of Nematic Liquid Crystals" by Roger Chang, Freeman B. Jones, Jr., and Edward P. Perry; and Ser. No. 357,565 entitled "Nematic Liquid Crystals Doped To Raise Their Dynamic Scattering Cutoff Frequency" by Freeman B. Jones, Jr. Each of these applications is incorporated herein by reference.

BACKGROUND OF THE INVENTION

1. Field of the Invention

The invention relates to the field of liquid crystal display systems.

2. Prior Art

When pure nematic liquid crystals are placed between the conductive plates of a display cell, the long axis of the crystals align randomly with respect to the walls of the cell. This is a weakly scattering alignment and therefore the contrast ratio of this alignment is very low. To overcome the low contrast ratio, dopants are added to the pure material. These dopants usually distort the alignment of the material, thus causing the display cell to display some contrast ratio even in its quiescent state. This is at best unaesthetic and at worst confusing to an observer as to which state the cell is in, until the observer has seen both states.

OBJECTS

A primary object of the invention is to improve the contrast ratio of liquid crystal display systems.

Another object is to provide a high-contrast-ratio liquid crystal display cell which is water clear in its quiescent state.

SUMMARY OF THE INVENTION

The inside of a liquid crystal display cell is coated with a solvent solution of an ionic surfactant. The solvent is evaporated and the unit is heated to bake the surfactant onto the wall surface. The cell is then filled with an ionically doped liquid crystal. It is preferred to have the ionic dopant in the liquid crystal the same as the surfactant which is baked onto the walls. The preferred ionic dopant is $(C_{18}H_{37})_2(CH_3)_2N^+B^-(C_6H_5)_4$ (ammonium boride-18) although use may be made of other dopants having the general formula $R_1R_2R_3R_4N^+B^-(R_5)_4$, where the $R_1$, $R_2$, $R_3$, $R_4$ and $R_5$ may be the same or different alkyl groups [$CH_3(CH_2)_n$ where $n$ is a positive integer or zero] or aryl groups [either phenyl or biphenyl]. The preferred liquid crystal material is substantially 55% 4-methoxybenzylidene-4'-n-butylaniline and substantially 45 percent 4-ethoxybenzylidene-4'-n-butylaniline by weight, preferably doped with p-aminophenol and p-toluenesulfonic acid to optimize the overall operational characteristics of the display cell.

BRIEF DESCRIPTION OF THE DRAWINGS

FIGS. 1–4 illustrate the steps involved in making a liquid crystal display cell in accordance with the invention.

DESCRIPTION OF THE INVENTION

Four steps in the production of a liquid crystal display cell are illustrated in FIGS. 1–4. An ionic dopant such as $(C_{18}H_{37})_2(CH_3)_2N^+B^-(C_6H_5)_4$ (ammonium boride-18) is added to very dilute concentrations of $(C_{18}H_{37})_2CH_3N$ in a suitable solvent such as chloroform. The display cell 20 is filled with this solution 22. The solvent is then evaporated from the cell to leave a residue 24 of the ionic dopant on the cell walls. The entire cell 20 is now heated to bake the residue onto the cell walls. The baking is continued until the residue has formed a thoroughly dry and firmly adhered coating 26 on the cell walls.

Subsequent to baking, the display cell is filled with a liquid crystal 28 containing an ionic dopant in 10–100 ppm concentrations. It has been found that the best results are obtained when the ionic dopant in the liquid crystal is the same as the ionic dopant baked onto the cell walls.

The ionic dopant is preferably of the formula $R_1R_2R_3R_4N^+B^-(R_5)_4$ where $R_1$, $R_2$, $R_3$, $R_4$ and $R_5$ are each selected from the group consisting of phenyl, biphenyl and $CH_3(CH_2)_n$, where n is a positive integer or zero. The copant $(C_{18}H_{37})_2(CH_3)_2N^+B^-(C_6H_5)_4$ (ammonium boride-18) has been found to be the best overall ionic dopant. A nematic Schiff-base liquid crystal comprising substantially 55 percent 4-methoxybenzylidene-4'-n-butylaniline and substantially 45 percent 4-ethoxybenzylidene-4'-n-butylaniline by weight, preferably doped with p-aminophenol and p-toluenesulfonic acid has been found to be the most effective liquid crystal in this system from an overall performance standpoint.

Upon introduction into the cell, the liquid crystals immediately align themselves with their long axis perpendicular to the cell walls, that is, homeotropically.

The resulting display cell is clear in the quiescent state, but scatters light very effectively when it is electrically excited. Thus, this cell has excellent display characteristics, since it is easily read when excited by an appropriate electric signal and is essentially invisible when in the quiescent state.

Although the preferred method of coating the cell walls with the ionic dopant is with a solvent solution, it will be understood that any method of coating which leaves the required residue may be used.

What is claimed is:

1. A liquid crystal display cell having a first ionic dopant baked onto the walls thereof and containing a liquid crystal material consisting essentially of 4-methoxybenzylidene-4'-n-butylaniline and 4-ethoxybenzylidene-4'-n-butylaniline, said liquid crystal material being doped with a second ionic dopant;

said first and second ionic dopants having the general formula $R_1R_2R_3R_4N^+B^-(R_5)_4$ where $R_1$, $R_2$, $R_3$, $R_4$ and $R_5$ are each selected from the group consisting of phenyl, biphenyl and $CH_3(CH_2)_n$, where n is a positive integer or zero.

2. The display cell of claim 3 wherein the ionic dopant in the liquid crystal has a concentration in the range of 10–100 ppm.

3. The display cell of claim 1 wherein the first and second ionic dopants contain $(C_{18}H_{37})_2(CH_3)_2N^+B^-(C_6H_5)_4$.

4. The display cell of claim 3 wherein the first ionic dopant further contains $(C_{18}H_{37})_2CH_3N$.

5. The display cell of claim 4 wherein the liquid crystal contains substantially 55 percent 4-methoxybenzylidene-4'-n-butylaniline and substantially 45 percent 4-ethoxybenzylidene-4'-n-butylaniline by weight.

6. The display cell of claim 5 wherein the liquid crystal is doped with p-aminophenol and p-toluenesulfonic acid; and the ionic dopant is present in concentrations of 10–100 ppm.

* * * * *